(12) United States Patent
Bedell et al.

(10) Patent No.: US 6,996,569 B1
(45) Date of Patent: Feb. 7, 2006

(54) SYSTEMS AND METHODS FOR CUSTOM GROUPING OF DATA

(75) Inventors: Jeffrey A. Bedell, Arlington, VA (US); Xun Feng, Sterling, VA (US); William Hurwood, Washington, DC (US); Ashutosh K. Jhaveri, San Francisco, CA (US); Benjamin Z. Li, Great Falls, VA (US); Xinyi Wang, Herndon, VA (US); Jun Yuan, Sterling, VA (US)

(73) Assignee: MicroStrategy Incorporated, McLean, VA (US)

( * ) Notice: Subject to any disclaimer, the term of this patent is extended or adjusted under 35 U.S.C. 154(b) by 552 days.

(21) Appl. No.: 10/120,192

(22) Filed: Apr. 11, 2002

Related U.S. Application Data

(63) Continuation-in-part of application No. 10/043,261, filed on Jan. 14, 2002, now abandoned, which is a continuation of application No. 09/884,442, filed on Jun. 20, 2001, now abandoned.

(51) Int. Cl.
*G06F 17/30* (2006.01)
(52) U.S. Cl. .................. 707/100; 707/102; 707/103 R
(58) Field of Classification Search ................ 707/2–4, 707/100, 102, 103 R–103 Z; 715/500
See application file for complete search history.

(56) References Cited

U.S. PATENT DOCUMENTS

| | | | |
|---|---|---|---|
| 4,688,195 A | 8/1987 | Thompson | 706/11 |
| 4,829,423 A | 5/1989 | Tennant | 704/8 |
| 5,197,005 A | 3/1993 | Shwartz | 707/2 |
| 5,276,870 A | 1/1994 | Shan | 707/2 |
| 5,418,943 A | 5/1995 | Borgida | 707/4 |
| 5,421,008 A | 5/1995 | Banning | 707/3 |
| 5,555,403 A | 9/1996 | Cambot | 709/4 |
| 5,584,024 A | 12/1996 | Shwartz | 707/4 |
| 5,664,182 A | 9/1997 | Nirenberg | 707/102 |
| 5,692,181 A | 11/1997 | Anand | 709/102 |
| 5,864,856 A | 1/1999 | Young | 707/100 |
| 5,870,746 A * | 2/1999 | Knutson et al. | 707/101 |
| 5,914,878 A | 6/1999 | Yamamoto | 700/106 |
| 5,918,225 A | 6/1999 | White | 707/3 |
| 5,918,232 A * | 6/1999 | Pouschine et al. | 707/103 R |
| 5,970,476 A | 10/1999 | Fahey | 705/28 |
| 6,154,766 A | 11/2000 | Yost | 709/201 |
| 6,247,008 B1 * | 6/2001 | Cambot et al. | 707/3 |
| 6,279,033 B1 | 8/2001 | Selvarajan | 709/217 |
| 6,295,527 B1 * | 9/2001 | McCormack et al. | 707/3 |
| 6,493,700 B2 * | 12/2002 | Couch et al. | 707/2 |

OTHER PUBLICATIONS

Gupta, Himanshu et al., "Index Selection for OLAP," IEEE 1063-6382, pp. 208-219.

(Continued)

*Primary Examiner*—Greta Robinson
*Assistant Examiner*—Cheryl Lewis
(74) *Attorney, Agent, or Firm*—Hunton & Williams LLP

(57) ABSTRACT

A system and method for creating a custom grouping of data in a database. A custom group object is created, a plurality of custom group elements are defined, each of the custom group elements being a subset of the custom group object and being defined by a different filter, each one of the different filters representing a logical expression of qualifications based on the data or a derived calculation of the data. Each of the different filters is resolved against the data or a subset of the data, and the plurality of custom group elements are grouped into a consolidated result set which in not naturally existing in the data structure.

22 Claims, 16 Drawing Sheets

OTHER PUBLICATIONS

Ho, Ching-Tien et al., "Partial-Sum Queries in OLAP Data Cubes Using Covering Codes," ACM 0-89791-910-6, pp. 228-237.

Robert C. Stern, Bruce M. Anderson and Craig W. Thompson, A Menu-Based Natural Language Interface To A Large Database, Texas Instrument Incorporated, P. O. Box 660246, MS 238, Dallas, Texas 75266, NAECON: National Aerospace & Electronics Conference, Dayton, Ohio, May 20-24, 1985.

Harry R. Tennant, Kenneth M. Ross, Richard M. Saenz, Craig W. Thompson, and James R. Miller, Computer Science Laboratory, Central Research Laboratories, Texas Instruments Incorporated, Dallas, Texas, 21st Annual Meeting of the Association for Computational Linguistics, MIT, Jun., 1983, pp. 151-158.

Harry R. Tennant, Member, IEEE, Roger R. Bate, Member, IEEE, Stephen M. Corey, Lawrence Davis, Paul Kline, LaMott G. Oren, Malipatola Rajinikanth, Richard Saenz, Daniel Stenger, Member, IEEE, and Craig W. Thompson, Software Innovations for the Texas Instruments Explorer Computer, Proceedings of the IEEE, vol. 73, No. 12, Dec. 1985.

Craig W. Thompson, Kenneth M. Ross, Harry R. Tennant and Richard M. Saenz, Building Usable Menu-Based Natural Language Interfaces To Databases, Proceedings of the Ninth International Conference on Very Large Data Bases, Florence Italy, Oct. 31-Nov. 2, 1983, pp 43-55.

Craig W. Thompson, John Kolts, and Kenneth W. Ross, A Toolkit for Building "Menu-Based Natural Language" Interfaces, Texas Instruments Incorporated, P. O. Box 226015, MS 238, Dallas, Texas 75265, 1985.

Craig Warren Thompson, M.A., B.A., Using Menu-Based Natural Language Understanding to Avoid Problems Associated with Traditional Natural Language Interfaces to Databases, Dissertation Presented to the Faculty of the Graduate School of The University of Texas at Austin, May 1984.

Business Objects User's Guide Version 5.1 (electronic copy on enclosed CD).

Getting Started with Business Objects Version 5.1 (electronic copy on enclosed CD).

Business Objects Deployment Guide (electronic copy on enclosed CD).

Broadcast Agent 5.1 (electronic copy on enclosed CD).

Business Objects 5.1 (electronic copy on enclosed CD).

Web Intelligence 2.6 (electronic copy on enclosed CD).

Business Objects Designer's Guide Version 5.1 (electronic copy on enclosed CD).

Business Objects Error Message Guide Version 5.1 (electronic copy on enclosed CD).

Business Objects Generic ODBC Access Guide Version 5.1 (electronic copy on enclosed CD).

Business Objects Info View User's Guide (electronic copy on enclosed CD).

Business Objects Installation and Upgrade Guide (electronic copy on enclosed CD).

Business Objects MS Access Databases Guide Version 5.1 (electronic copy on enclosed CD).

Business Objects MS SQL Server Database Guide Version 5.1 (electronic copy on enclosed CD).

Business Objections Supervisor's Guide Version 5.1 (electronic copy on enclosed CD).

Quick Start MicroStrategy Agent Version 6.0 (electronic copy on enclosed CD).

User Guide MicroStrategy Agent Verison 6.0 (electronic copy on enclosed CD).

User Guide MicroStrategy Architect Version 6.0 (electronic copy on enclosed CD).

User Guide MicroStrategy Objects Version 6.0 (electronic copy on enclosed CD).

Excel Add-In MicroStrategy Objects Version 6.0 (electronic copy on enclosed CD).

User Guide MicroStrategy Intelligence Server Version 6.0 (electronic copy on enclosed CD).

User Guide MicroStrategy Administrator Version 6.0 (electronic copy on enclosed CD).

Administrator Guide MicroStrategy Administrator Version 6.5 (electronic copy on enclosed CD).

* cited by examiner

Custom Group
Workflow

Regular Custom Group
Example Report: "Dollar Sales by Age Groups"

SQL
Statements

1st SQL pass for age group "< 25"

| | |
|---|---|
| select | sum(a11.[ORDER_AMT]) |
| from | [ORDER_FACT] a11, |
| | [LU_EMPLOYEE] a12, |
| | [LU_ORDER] a13, |
| | [LU_CUSTOMER] a14, |
| | [LU_DATE] a15 |
| where | a11.[EMP_ID] = a12.[EMP_ID] |
| and | a11.[ORDER_ID] = a13.[ORDER_ID] |
| and | a13.[CUSTOMER_ID] = a14.[CUSTOMER_ID] |
| and | a11.[ORDER_DATE] = a15.[DATE_ID] |
| and | (a15.[YEAR_ID] in (1997) |
| and | Year(Date())-Year(a14.[CUST_BIRTHDATE]) < 25 |

FIG. 6

Custom Group   Regular Custom Group
Workflow       Example Report: "Dollar Sales by Age Groups"

SQL            2nd SQL pass for age group "25 - 35"
Statements

```
select  sum(a11.[ORDER_AMT])
from    [ORDER_FACT] a11,
        [LU_EMPLOYEE] a12,
        [LU_ORDER] a13,
        [LU_CUSTOMER] a14,
        [LU_DATE] a15
where   a11.[EMP_ID] = a12.[EMP_ID]
and     a11.[ORDER_ID] = a13.[ORDER_ID]
and     a13.[CUSTOMER_ID] = a14.[CUSTOMER_ID]
and     a11.[ORDER_DATE] = a15.[DATE_ID]
and     (a15.[YEAR_ID] in (1997)
         Year(Date())-Year(a14.[CUST_BIRTHDATE]) between 25
and 35
```

FIG. 7

Custom Group    Regular Custom Group
Workflow        Example Report: "Dollar Sales by Age Groups"

SQL             3rd SQL pass for age group "36 - 50"
Statements

```
select  sum(a11.[ORDER_AMT])
from    [ORDER_FACT] a11,
        [LU_EMPLOYEE] a12,
        [LU_ORDER] a13,
        [LU_CUSTOMER] a14,
        [LU_DATE] a15
where   a11.[EMP_ID] = a12.[EMP_ID]
and     a11.[ORDER_ID] = a13.[ORDER_ID]
and     a13.[CUSTOMER_ID] = a14.[CUSTOMER_ID]
and     a11.[ORDER_DATE] = a15.[DATE_ID]
and     (a15.[YEAR_ID] in (1997)
and     Year(Date())-Year(a14.[CUST_BIRTHDATE]) between 36
and 50
```

FIG. 8

| Custom Group Workflow | Regular Custom Group |
|---|---|
| | Example Report: "Dollar Sales by Age Groups" |
| | 4th SQL pass for age group "51 - 60" |
| SQL Statements | |

```
select  sum(a11.[ORDER_AMT])
from    [ORDER_FACT] a11,
        [LU_EMPLOYEE] a12,
        [LU_ORDER] a13,
        [LU_CUSTOMER] a14,
        [LU_DATE] a15
where   a11.[EMP_ID] = a12.[EMP_ID]
and     a11.[ORDER_ID] = a13.[ORDER_ID]
and     a13.[CUSTOMER_ID] = a14.[CUSTOMER_ID]
and     a11.[ORDER_DATE] = a15.[DATE_ID]
and     (a15.[YEAR_ID] in (1997)
and     Year(Date())-Year(a14.[CUST_BIRTHDATE]) between 51 and 60
```

FIG. 9

Custom Group Workflow

Regular Custom Group
Example Report: "Dollar Sales by Age Groups"

5th SQL pass for age group "> 60"

SQL Statements

```
select   sum(a11.[ORDER_AMT])
from     [ORDER_FACT] a11,
         [LU_EMPLOYEE] a12,
         [LU_ORDER] a13,
         [LU_CUSTOMER] a14,
         [LU_DATE] a15
where    a11.[EMP_ID] = a12.[EMP_ID]
and      a11.[ORDER_ID] = a13.[ORDER_ID]
and      a13.[CUSTOMER_ID] = a14.[CUSTOMER_ID]
and      a11.[ORDER_DATE] = a15.[DATE_ID]
and      (a15.[YEAR_ID] in (1997)
and      Year(Date())-Year(a14.[CUST_BIRTHDATE]) > 60
```

FIG. 10

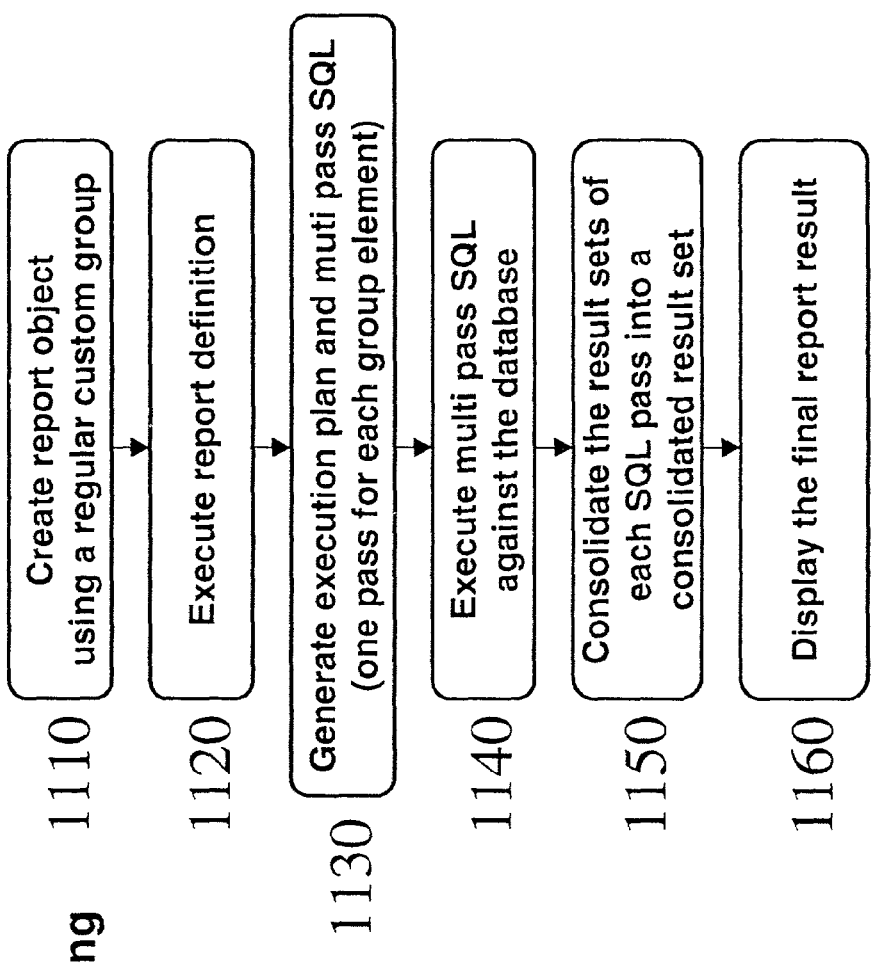

Custom Group Workflow

SQL Statements

```
select      a13.[CUSTOMER_ID] AS CUSTOMER_ID,
            sum(a11.[ORDER_AMT]) as WJXBFS1
from        [ORDER_FACT] a11, [LU_EMPLOYEE] a12, [LU_ORDER] a13
where       a11.[EMP_ID] = a12.[EMP_ID]
and         a11.[ORDER_ID] = a13.[ORDER_ID]
and         a12.[CALL_CTR_ID] in (4)
group by    a13.[CUSTOMER_ID]

create table ZZTYF00SQGXMQ000 (CUSTOMER_ID LONG, DA48 DOUBLE)

[An analytical SQL]
insert into ZZTYF00SQGXMQ000 values (9, 3)
[The rest of the INSERT statements have been omitted from display]

select      sum(a11.[ORDER_AMT]) as WJXBFS1
from        [ORDER_FACT] a11, [LU_ORDER] a12, [ZZTYF00SQGXMQ000] a13,
            [LU_EMPLOYEE] a14
where       a11.[ORDER_ID] = a12.[ORDER_ID]
and         a12.[CUSTOMER_ID] = a13.[CUSTOMER_ID]
and         a11.[EMP_ID] = a14.[EMP_ID]
and         a14.[CALL_CTR_ID] in (4)

select      a13.[DA48] AS DA48,
            sum(a11.[ORDER_AMT]) as WJXBFS1
from        [ORDER_FACT] a11, [LU_ORDER] a12, [ZZTYF00SQGXMQ000] a13,
            [LU_EMPLOYEE] a14
where       a11.[ORDER_ID] = a12.[ORDER_ID]
and         a12.[CUSTOMER_ID] = a13.[CUSTOMER_ID]
and         a11.[EMP_ID] = a14.[EMP_ID]
and         a14.[CALL_CTR_ID] in (4)
group by    a13.[DA48]
```

FIG. 14

SYSTEMS AND METHODS FOR CUSTOM GROUPING OF DATA

RELATED APPLICATION DATA

This application is a continuation-in-part of U.S. application Ser. No. 10/043,261 entitled "Systems and Methods for Custom Grouping of Data," filed on Jan. 14, 2002, abandoned, which is a continuation of U.S. application Ser. No. 09/884,442 entitled "Systems and Methods for Custom Grouping of Data," filed on Jun. 20, 2001, abandoned.

FIELD OF THE INVENTION

The invention relates to the field of databases. More specifically, the invention relates to the field of database filtering, grouping and output.

BACKGROUND OF THE INVENTION

With the large databases common in business today, data sorting and filtering is an important part of business management. As databases become larger and the desired filtering and grouping of the data becomes more complex, systems and methods for quickly and easily filtering and grouping data are required.

SUMMARY OF THE INVENTION

The invention solves at least these problems and others in the art by providing systems and methods for grouping data that is stored in a database. The data in conventional databases is stored within some logical and predefined structure. Typically, the structure consists of tables, each table having defined columns. Data is inserted into the tables, with each column holding a unique field of data for a give row. Such a structure will yield natural groupings, wherein data in a given table may be grouped or aggregated by one or more columns existing in one or more tables. Embodiments of the invention facilitate filtering and sorting the data by permitting the creation of custom groupings of the data that do not conform to the predefined logical rigid structure of the database, but rather are based on user input. As a result, reports can be produced that show data grouped together that are completely unrelated in the database structure, hence the term custom grouping. Natural groupings may be considered those groupings which can be done based on the data found in the relational database tables (excluding temporary tables or other techniques used to augment the database for the purposes of custom groupings). Custom groupings extend the options offered by the natural groupings by using additional data, typically in the form of user input or user defined groupings—to indicate how database records should be grouped and/or aggregated.

More specifically, data may be grouped using one or more techniques, including metric banding (grouping data using a set of ranges applied to a given metric), derived or calculated values (spanning one or more columns), derived expressions (spanning one or more columns), and other forms of data filtering (based on data or derived data). Custom groups can be included in reports and produced without the need for separately performing defining filters and/or reports and combining the outputs of multiple reports to produce a similar display.

Particular embodiments of methods of the invention include grouping data that is stored in a database, the data having a data structure. A custom group object may contain one or more custom group elements, each of the custom group elements being a subset of the custom group object and being defined by a specific filter and/or expression that is processed independently. Different custom group elements may actually contain the same filters, if desired. Each filter represents a logical expression of qualifications based on one of the data and a derived calculation of the data. Each of the different filters are resolved against the data or a subset of the data; and the plurality of custom group elements are grouped into a consolidated result set which is not naturally existing in the data structure.

Several examples may provide further understanding. In general, data has natural groupings based on the data itself or on the way it is stored. For example, imagine a simple customer database that consists of a single table containing two columns, Customer_Name and Customer_Age. A natural grouping of this data would be one based on Customer_Age. Using such a grouping, a system could aggregate (e.g., count or simply display) the individual customers into groups based on individual Customer_Age values, since these are related to Customer_Name in the database. This approach may yield more groupings that desired, since each distinct age value will become a group element—if there are 99 distinct age values (from 1 to 99 say), then there would be 99 distinct grouping elements. A custom group allows the user to define "custom" groupings based on filters, calculations and other derived values, to produce more meaningful groupings and grouping elements. Continuing with the example, one example of a custom group would be one consisting of three custom group elements. Lets call the custom group, "My Three Age Ranges," and define three custom group elements (A, B, C) where custom group element A is defined as "where Customer_Age is less than 20," where custom group element B is defined as "where Customer_Age is between 20 and 50," and where custom group element C is defined as "where Customer_Age is greater than 50." When used for reporting purposes, this new custom group—"My Three Age Ranges"—results in the production of only three custom group elements based on the custom criteria, allowing for more flexibility than in the case where the system only relied on natural grouping options.

As mentioned above, a custom group element is the definition of part of a custom group. It may, according to one embodiment, consist primarily of a filter and may return a single value—the aggregated result of a function applied over the filtered data set—or a set of unaggregated elements equal to the filtered data set. In the example above, custom group element A could be displayed in either form. If displayed in aggregate form using a count function, the result of custom group element A would a single number representing the count of all customers under the Customer_Age of 20. If displayed in unaggregated form, custom group element A would appear as a list of customers who are under the Customer_Age of 20.

A special type of custom group element is calculated using a metric and a range. For example, a custom group element may be defined as the top 10 customers based on their sales activity. To calculate this group element, the system first calculates sales by customer, ranks all customers based on their sales value, and then filters only the top 10. Often, this logic is used to calculate an entire custom group. This process is termed metric banding. Instead of using unrelated filters, a custom group is defined as a set of elements, each element containing a range of sales ranks. For example, the custom group would contain 10 elements, each element containing 10% of the customers with element 1 containing the top 10%, element 2 containing the next 10%, etc. Again, like all custom groups, this grouping does not natural exist in the database but rather is produced by applying user defined criteria and a custom group processing engine.

Lastly, a custom group object is a user defined object available for use in reports —meaning a user may define his or her own grouping in place of a basic attribute grouping, and insert this grouping into a report. Similar functionality may be obtained by first creating new structures within the database and then making those available for reporting purposes, but this is simply altering the database to include new grouping options. Custom grouping involves the definition to be primarily stored in a user defined object not necessarily stored as part of the database on which it may be applied.

Other advantages of the present invention will be understood by one of ordinary skill in the art from the entirety of this specification.

BRIEF DESCRIPTION OF THE DRAWING FIGURES

The invention will be more fully understood from the following Detailed Description of Preferred Embodiments and the following figures, of which:

FIGS. 6–10 illustrate examples of SQL language for various passes used to generate the report shown in FIG. 5;

FIG. 11 is a flowchart illustrating steps performed by a process of an embodiment of the invention in which a report using a custom group is generated;

FIG. 14 illustrates an example of SQL language used to generate a report such as that shown in FIG. 13.

DETAILED DESCRIPTION OF THE PRESENT INVENTION

Figure 1:
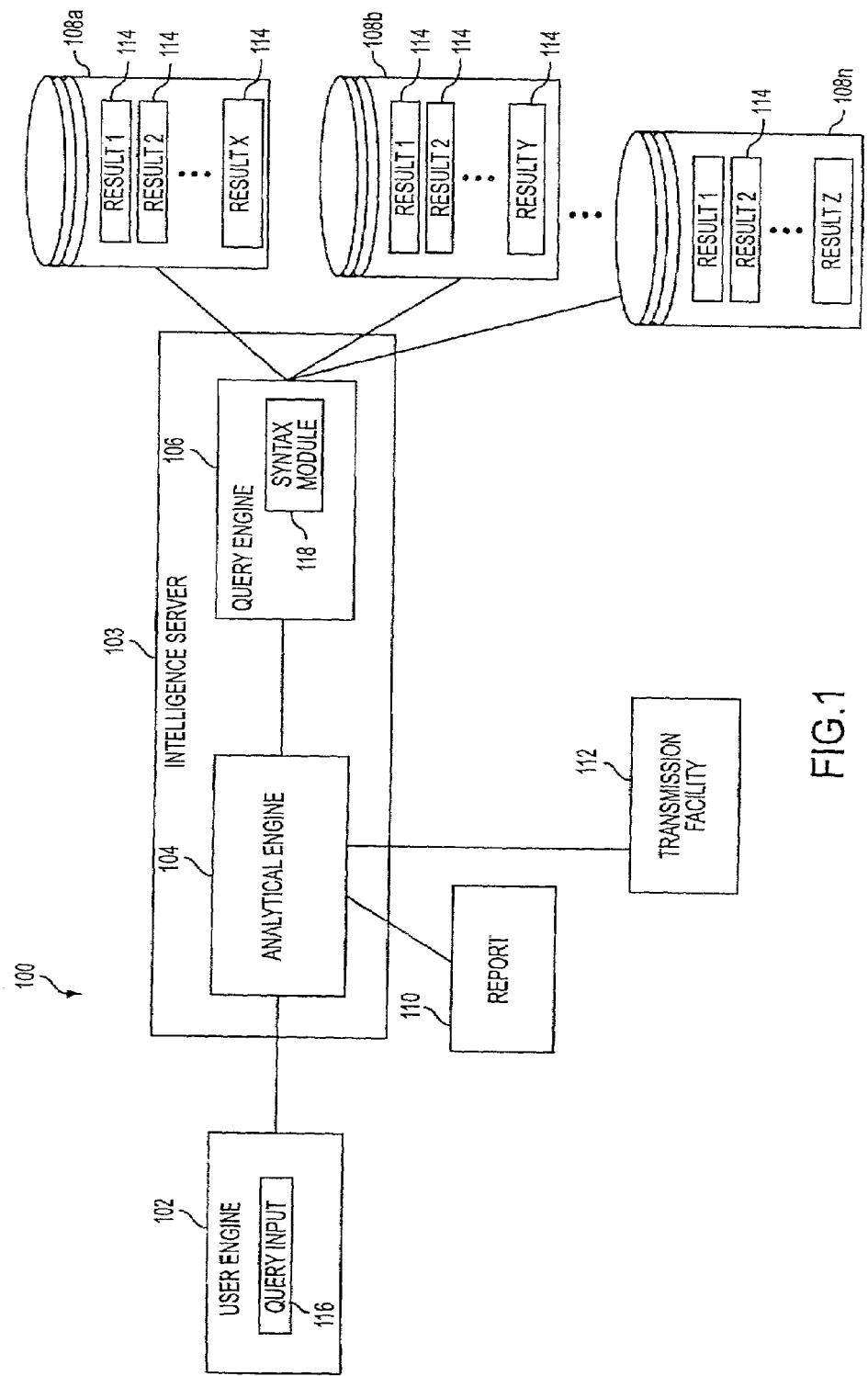
FIG. 1 is a block diagram illustrating an architecture for a system according to an embodiment of the invention.
Figure 2:
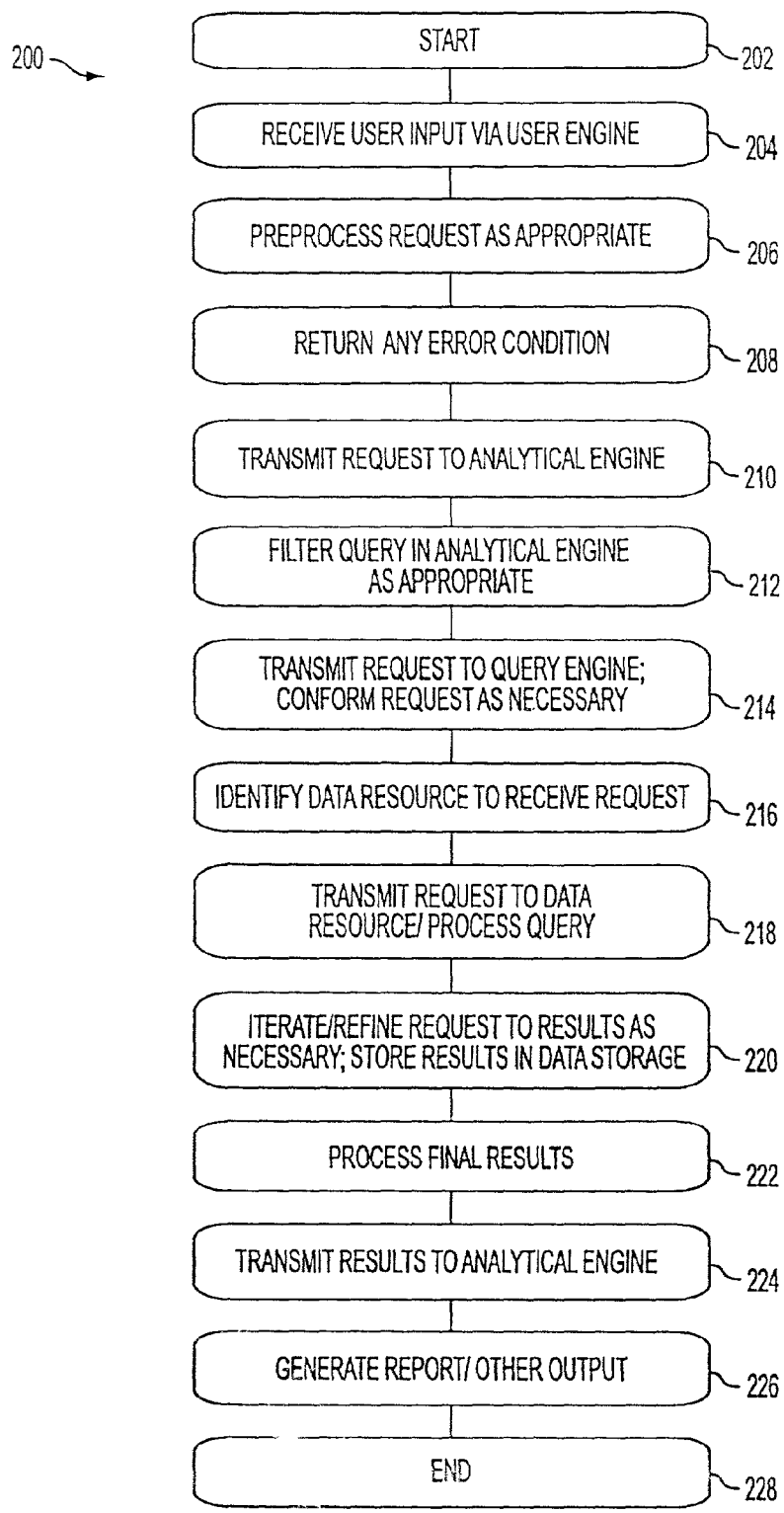
FIG. 2 is a flowchart illustrating steps performed by a process utilizing a query engine according to an embodiment of the invention.

While the present invention relates to custom grouping of data, FIGS. 1 and 2 relate to an embodiment of an architecture for processing data in which this invention may be used.

FIG. 1 is a block diagram illustrating a system 100 by which a variety of data resources may be accessed for business analytic, report generation and other intelligence purposes according to an embodiment of the invention. According to a preferred embodiment, the system 100 may comprise an Online Analytical Processing (OLAP) decision support system (DSS). In particular, FIG. 1 may comprise a portion of the MicroStrategy 7 or 7.1 platform which provides a preferred system in which the present invention may be implemented.

In general, through using the system 100 of the invention, analysts, managers and other users may query or interrogate a plurality of databases or database arrays to extract demographic, sales, and/or financial data and information and other patterns from records stored in such databases or database arrays to identify strategic trends. Those strategic trends may not be discernable without processing the queries and treating the results of the data extraction according to the techniques performed by the systems and methods of the invention. This is in part because the size and complexity of some data portfolios stored in such databases or database arrays may mask those trends.

In addition, system 100 may enable the creation of reports or services that are processed according to a schedule. Users may then subscribe to the service, provide personalization criteria and have the information automatically delivered to the user, as described in U.S. Pat. No. 6,154,766 to Yost et al., which is commonly assigned and hereby incorporated by reference.

As illustrated in FIG. 1, a business, a government or another user may access the resources of the system 100 using a user engine 102. The user engine 102 may include a query input module 116 to accept a plurality of searches, queries or other requests, via a query box on a graphical user interface (GUI) or another similar interface. The user engine 102 may communicate with an analytical engine 104. The analytical engine 104 may include a set of extensible modules to run a plurality of statistical analyses, to apply filtering criteria, to perform a neural net technique or another technique to condition and treat data extracted from data resources hosted in the system 100, according to a query received from the user engine 102.

The analytical engine 104 may communicate with a query engine 106, which in turn interfaces to one or more data storage devices 108a, 108b . . . 108n (where n is an arbitrary number). The data storage devices 108a, 108b . . . 108n may include or interface to a relational database or another structured database stored on a hard disk, an optical disk, a solid state device or another similar storage media. When implemented as databases, the data storage devices 108a, 108b . . . 108n may include or interface to, for example, an Oracle™ relational database such as sold commercially by Oracle Corporation, an Informix™ database, a Database 2 (DB2) database, a Sybase™ database, or another data storage device or query format, platform or resource such as an OLAP format, a Standard Query Language (SQL) format, a storage area network (SAN), or a Microsoft Access™ database. It should be understood that while data storage devices 108a, 108b . . . 108n are illustrated as a plurality of data storage devices, in some embodiments the data storage devices may be contained within a single database or another single resource.

Any of the user engine 102, the analytical engine 104 and the query engine 106 or other resources of the system 100 may include or interface to or be supported by computing resources, such as one or more associated servers. When a server is employed for support, the server may include, for instance, a workstation running a Microsoft Windows™ NT™ operating system, a Windows™ 2000 operating system, a Unix operating system, a Linux operating system, a Xenix operating system, an IBM AIX™ operating system, a Hewlett-Packard UX™ operating system, a Novell Netware™ operating system, a Sun Microsystems Solaris™ operating system, an OS/2™ operating system, a BeOS™ operating system, a Macintosh operating system, an Apache platform, an OpenStep™ operating system, or another similar operating system or platform. According to one embodiment of the present invention, analytical engine 104 and query engine 106 may comprise elements of an intelligence server 103.

The data storage devices 108a, 8b . . . 108n may be supported by a server or another resource and may, in some embodiments, include redundancy, such as a redundant array of independent disks (RAID), for data protection. The storage capacity of any one or more of the data storage devices 108a, 108b . . . 108n may be of various sizes, from relatively small data sets to very large database (VLDB)-scale data sets, such as warehouses holding terabytes of data or more. The fields and types of data stored within the data storage devices 108a, 108b . . . 108n may also be diverse, and may include, for instance, financial, personal, news, marketing, technical, addressing, governmental, military, medical or other categories of data or information.

The query engine 106 may mediate one or more queries or information requests from those received from the user at the user engine 102 to parse, filter, format and otherwise process such queries to be submitted against the data contained in the data storage devices 108a, 108b . . . 108n. Thus, a user at the user engine 102 may submit a query requesting information in SQL format, or have the query translated to SQL format. The submitted query is then transmitted via the analytical engine 104 to the query engine 106. The query engine 106 may determine, for instance, whether the transmitted query may be processed by one or more resources of the data storage devices 108a, 108b . . . 108n in its original format. If so, the query engine 106 may directly transmit the query to one or more of the resources of the data storage devices 108a, 108b . . . 108n for processing.

If the transmitted query cannot be processed in its original format, the query engine 106 may perform a translation of the query from an original syntax to a syntax compatible with one or more of the data storage devices 108a, 108b . . . 108n by invoking a syntax module 118 to conform the syntax of the query to standard SQL, DB2, Informix™, Sybase™ formats or to other data structures, syntax or logic. The query engine 106 may likewise parse the transmitted query to determine whether it includes any invalid formatting or to trap other errors included in the transmitted query, such as a request for sales data for a future year or other similar types of errors. Upon detecting an invalid or an unsupported query, the query engine 106 may pass an error message back to the user engine 102 to await further user input.

When a valid query such as a search request is received and conformed to a proper format, the query engine 106 may pass the query to one or more of the data storage devices 108a, 108n . . . 108n for processing. In some embodiments, the query may be processed for one or more hits against one or more databases in the data storage devices 108a, 108b . . . 108n. For example, a manager of a restaurant chain, a retail vendor or another similar user may submit a query to view gross sales made by the restaurant chain or retail vendor in the State of New York for the year 1999. The data storage devices 108a, 108b . . . 108n may be searched for one or more fields corresponding to the query to generate a set of results 114.

Although illustrated in connection with each data storage device 108 in FIG. 1, the results 114 may be generated from querying any one or more of the databases of the data storage devices 108a, 108b . . . 108n, depending on which of the data resources produce hits from processing the search query. In some embodiments of the system 100 of the invention, the results 114 may be maintained on one or more of the data storage devices 108a, 108b . . . . 108n to permit one or more refinements, iterated queries, joinders or other operations to be performed on the data included in the results 114 before passing the information included in the results 114 back to the analytical engine 104 and other elements of the system 100.

When any such refinements or other operations are concluded, the results 114 may be transmitted to the analytical engine 104 via the query engine 106. The analytical engine 104 may then perform statistical, logical or other operations on the results 114 for presentation to the user. For instance, the user may submit a query asking which of its retail stores in the State of New York reached $1 M in sales at the earliest time in the year 1999. Or, the user may submit a query asking for an average, a mean and a standard deviation of an account balance on a portfolio of credit or other accounts.

The analytical engine 104 may process such queries to generate a quantitative report 110, which may include a table or other output indicating the results 114 extracted from the data storage devices 108a, 108b . . . 108n. The report 110 may be presented to the user via the user engine 102, and, in some embodiments, may be temporarily or permanently stored on the user engine 102, a client machine or elsewhere, or printed or otherwise output. In some embodiments of the system 100 of the invention, the report 110 or other output may be transmitted to a transmission facility 112, for transmission to a set of personnel via an email, an instant message, a text-to-voice message, a video or via another channel or medium. The transmission facility 112 may include or interface to, for example, a personalized broadcast platform or service such as the Narrowcaster™ platform or Telecaster™ service sold by MicroStrategy Incorporated or another similar communications channel or medium. Similarly, in some embodiments of the invention, more than one user engine 102 or other client resource may permit multiple users to view the report 110, such as, for instance, via a corporate intranet or over the Internet using a Web browser. Various authorization and access protocols may be employed for security purposes to vary the access permitted users to such report 110 in such embodiments.

Additionally, as described in the '766 patent, an administrative level user may create a report as part of a service. Subscribers/users may then receive access to reports through various types of data delivery devices including telephones, pagers, PDAs, WAP protocol devices, email, facsimile, and many others. In addition, subscribers may specify trigger conditions so that the subscriber receives a report only when that condition has been satisfied, as described in detail in the '766 patent. The platform of FIG. 1 may have many other uses, as described in detail with respect to the MicroStrategy 7 and 7.1 platform, the details of which will be appreciated by one of ordinary skill in the reporting and decision support system art.

The steps performed in a method 200 for processing data according to the invention are illustrated in the flowchart of FIG. 2. In step 202, the method 200 begins. In step 204, the user may supply input, such as a query or a request for information, via the user engine 102. In step 206, the user input query may be preliminarily processed, for instance, to determine whether it includes valid fields and for other formatting and error-flagging issues. In step 208, any error conditions may be trapped and an error message presented to the user, for correction of the error conditions. In step 210, if a query is in a valid format, the query may then be transmitted to the analytical engine 104.

In step 212, the analytical engine 104 may further process the input query as appropriate to ensure the intended results 114 may be generated to apply the desired analytics. In step 214, the query engine 106 may further filter, format and otherwise process the input query to ensure that the query is in a syntax compatible with the syntax of the data storage devices 108a, 108b . . . 108n. In step 216, one or more appropriate databases or other resources within the data storage devices 108a, 108b . . . 108n may be identified to be accessed for the given query.

In step 218, the query may be transmitted to the data storage devices 108a, 108b . . . 108n and the query may be processed for hits or other results 114 against the content of the data storage devices 108a, 108b . . . 108n. In step 220, the results 114 of the query may be refined, and intermediate or other corresponding results 114 may be stored in the data storage devices 108a, 108b . . . 108n. In step 222, the final results 114 of the processing of the query against the data storage devices 108a, 108b . . . 108n may be transmitted to the analytical engine 104 via the query engine 106. In step 224, a plurality of analytical measures, filters, thresholds, statistical or other treatments may be run on the results 114. In step 226, a report 110 may be generated. The report 110, or other output of the analytic or other processing steps, may be presented to the user via the user engine 102. In step 228, the method 200 ends.

An example of a preferred embodiment of the invention is shown in FIGS. 3–16. In this embodiment, a custom group can be defined that is not constrained by the existing structure of the database being searched. The custom group is an object containing one or more custom group elements. Each custom group element is defined by a filter. Each filter is applied to the data to produce a subset of data. The filter may contain a calculation which first produces some derived data and then performs a filtering operation on the derived data to produce a subset of the data. The custom group element is either the subset of data produced by applying its filter or an aggregate value (or values) derived from the subset. The custom group is the collection of all custom group elements.

Figure 3:
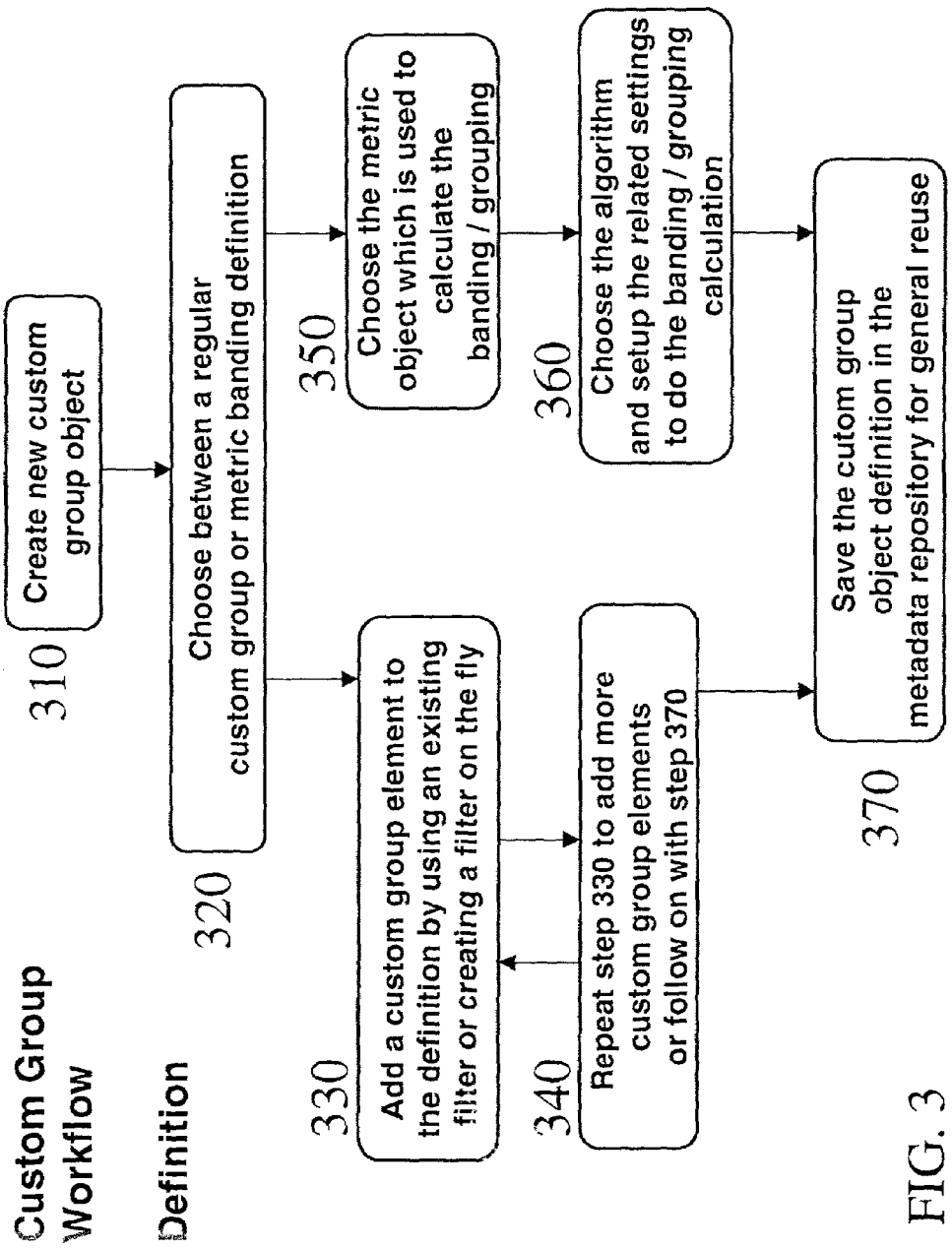
FIG. 3 is a flowchart illustrating steps performed by a process of an embodiment of the invention in which a custom group is defined.

In FIG. 3, a custom group object definition is created that can be used to generate a report that shows particular data that cannot easily be shown using conventional methods. In step 310, a new custom group object is created such as, for example, "Age Groups". In step 320, a choice is made between defining a regular custom group or defining a metric banding. A regular custom group is a group of elements in which the filter criteria of each element is defined by a user. A regular custom group can be grouped by, for example, age groups, office locations, store size, total sales, or other grouping that is supported by the data in the database. Metric banding refers to calculating a particular value, for example a monetary value, on which the data is banded. Metric banding often uses an algorithm to calculate the particular value on which the data is banded. Although regular custom groups can be grouped by a metric value, the metric value is one that exists in the database.

In step 330, a custom group element, for example, ages 36–50, is added to the definition of the custom group "Age Groups" by using an existing filter or creating a new filter. In step 340, the process of step 330 is repeated as often as desirable and then processing proceeds to step 370. In step 370, the custom group object definition is saved, for example, in the metadata repository for general reuse.

If in step 320 a metric banding definition is chosen, processing proceeds to step 350. In step 350, the metric object, for example "Dollar Sales", to be used to calculate the banding/grouping is chosen. Processing then proceeds to step 360 where the algorithm is chosen and the related settings to do the banding/grouping calculation are set up. Processing then proceeds to step 370 described above.

Figure 4:
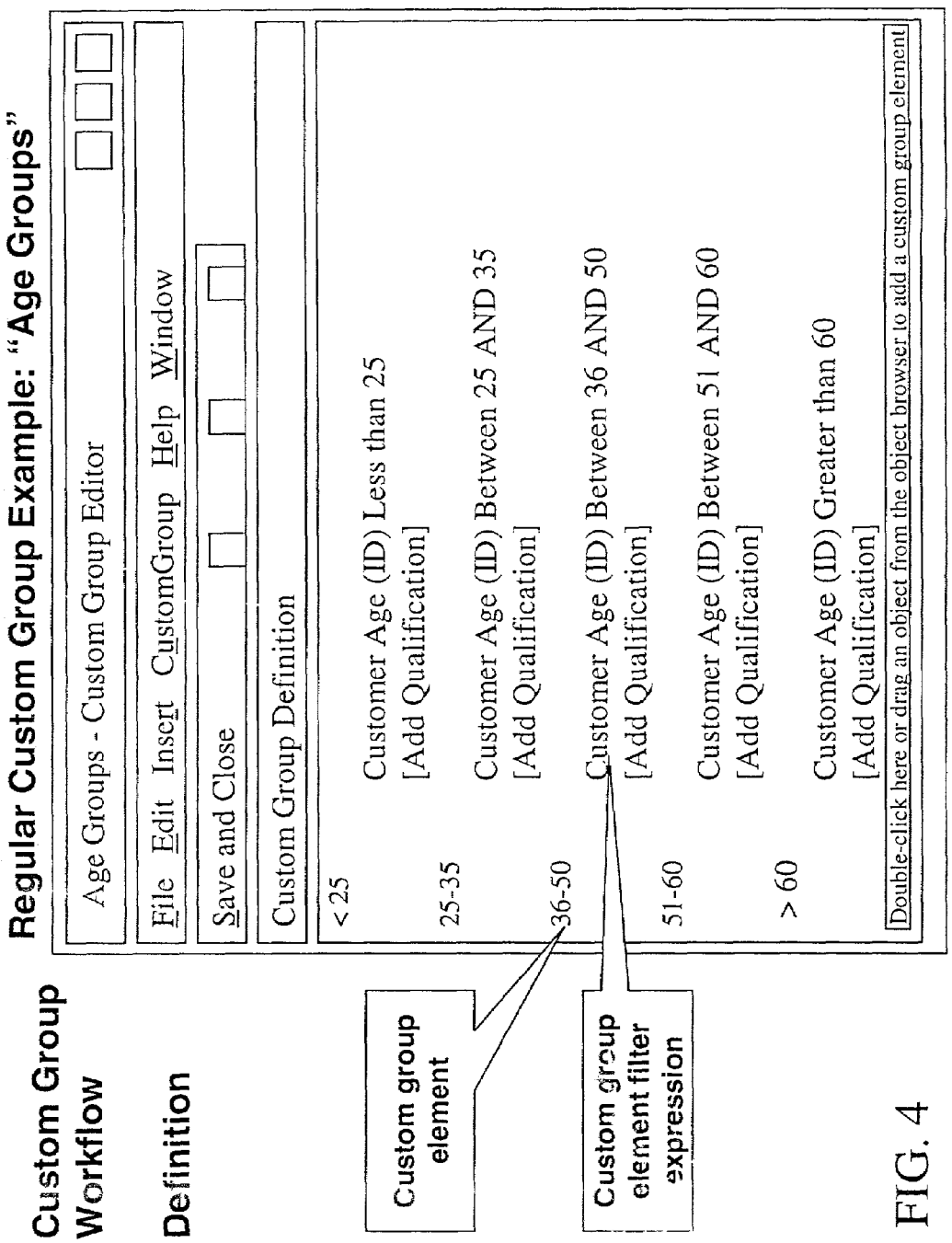
FIG. 4 illustrates an example of an interface display of a custom group definition.

FIG. 4 shows an example of a user interface display on which a custom group definition for "Age Groups" is shown. In FIG. 4, the custom group "Age Groups" is split into five age groups, or custom group elements, and a custom group element filter expression is shown for each custom group element. Custom group elements can be added to the custom group definition by directly typing them in or by dragging objects from an object browser into the custom group definition display area.

Figure 5:
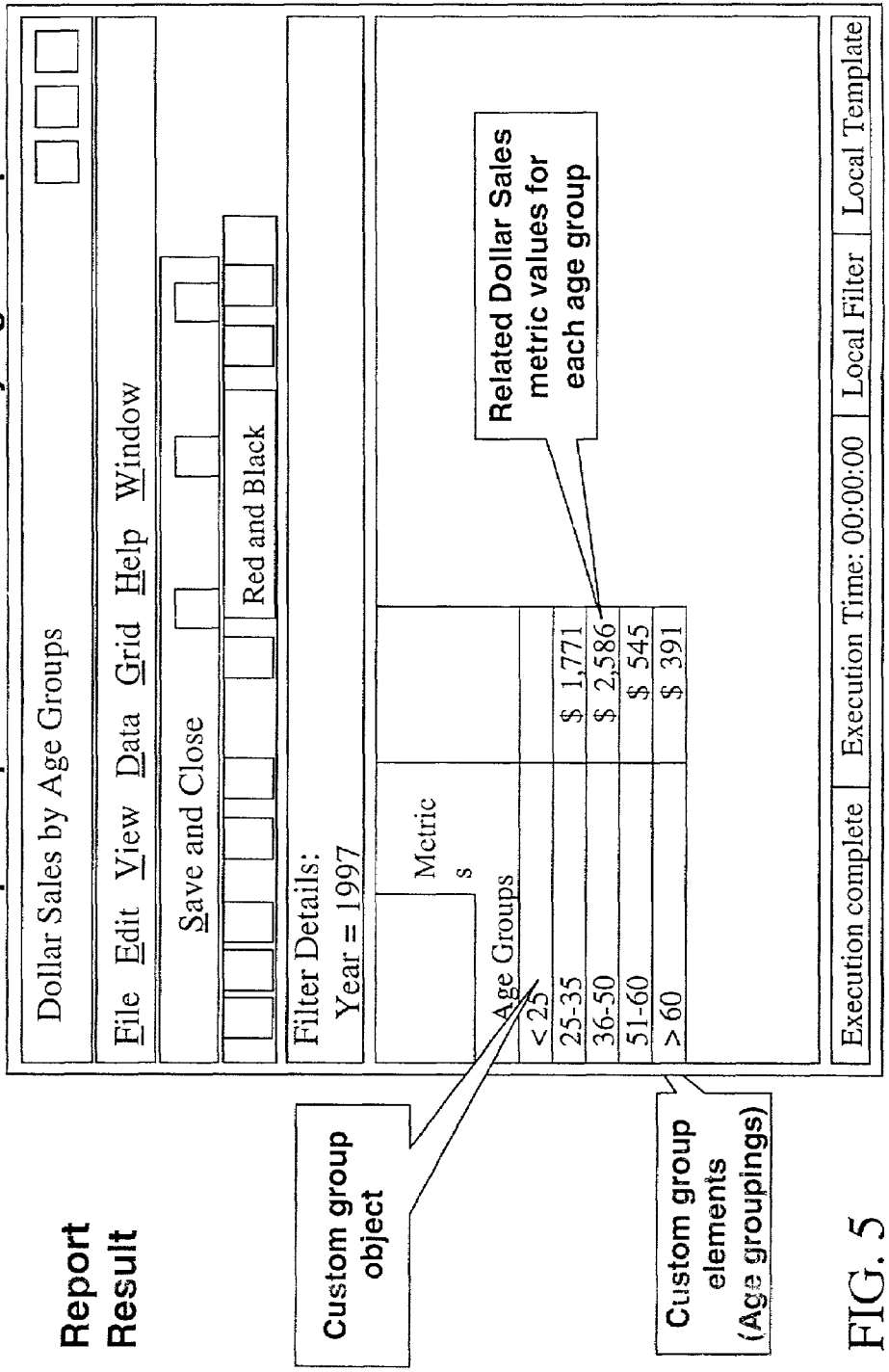
FIG. 5 illustrates an example of an interface display of a report using a custom group.

FIG. 5 shows an example of a user interface display on which a report entitled "Dollar Sales by Age Groups" is shown. The report shows the custom group object "Age Groups" broken down into the custom group elements (age groupings) with the metric value (Related Dollar Sales) for each age group.

Each of FIGS. 6–10 shows an SQL statement for one of the custom group elements (age groupings) shown in FIG. 5. FIGS. 6–10 show the SQL statements for age groups <25, 25–35, 36–50, 51–60 and >60, respectively.

FIG. 11 shows an example of a flowchart illustrating processing involved with creating and displaying a report of a regular custom group, a regular custom group being a custom group that does not require an algorithm to set up the filter for any custom group element. An example of such a report is shown in FIG. 5. In step 110, a report object, for example "Age Groups", using a regular custom group is created. In step 120, the report definition is executed. In step 130, an execution plan is generated based on the report definition, including one SQL pass for each group element, for example those shown in FIGS. 6–10. In step 140, the execution plan generated in step 130 is executed, resulting in multiple SQL passes against the database. In step 1150, the result set of each SQL pass made in step 1140 are merged into a consolidated result set. In step 1160, the final report results are displayed, for example, on a user interface.

Figure 12:
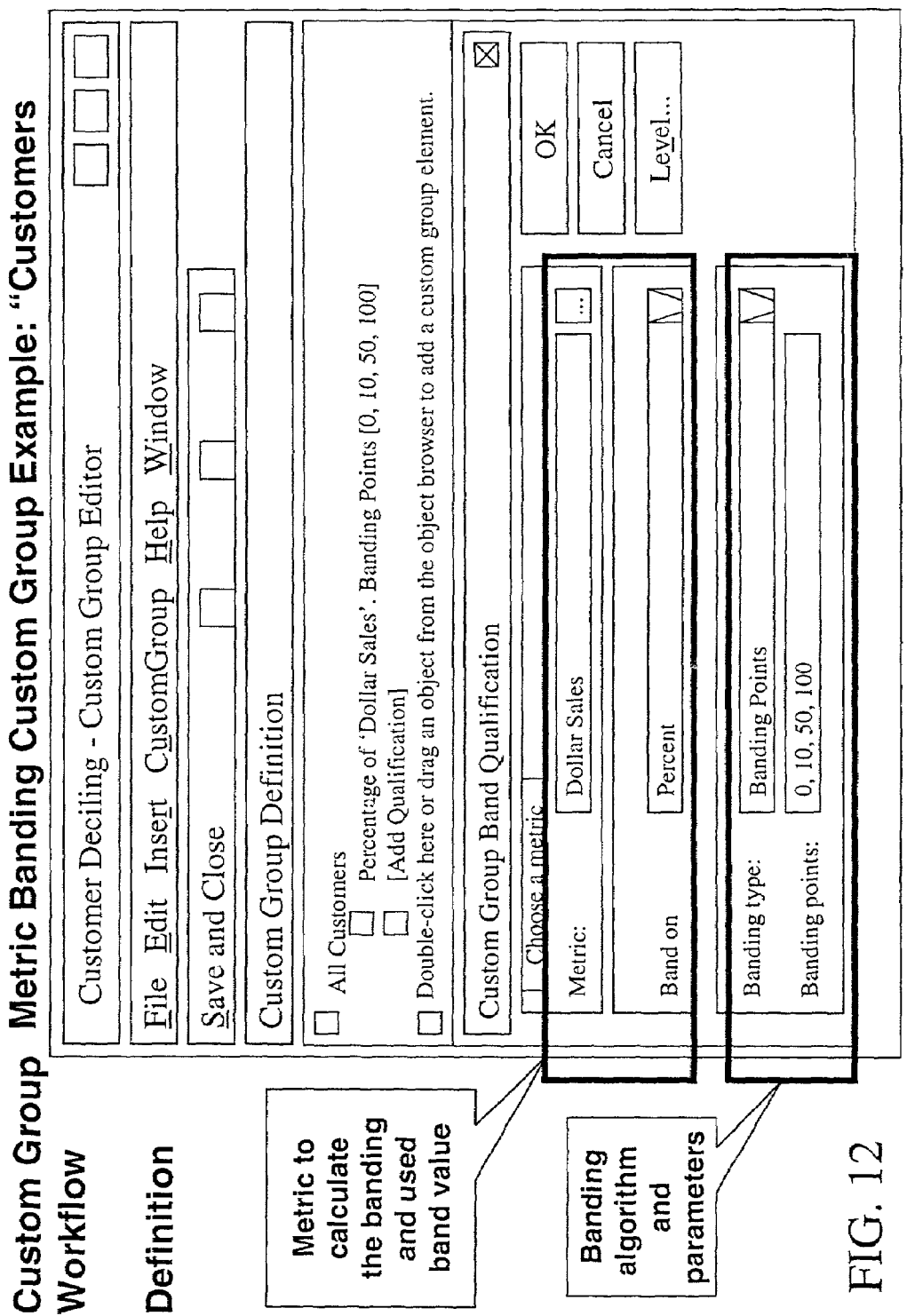
FIG. 12 illustrates an example of an interface display of metric banding using a custom group.
Figure 13:
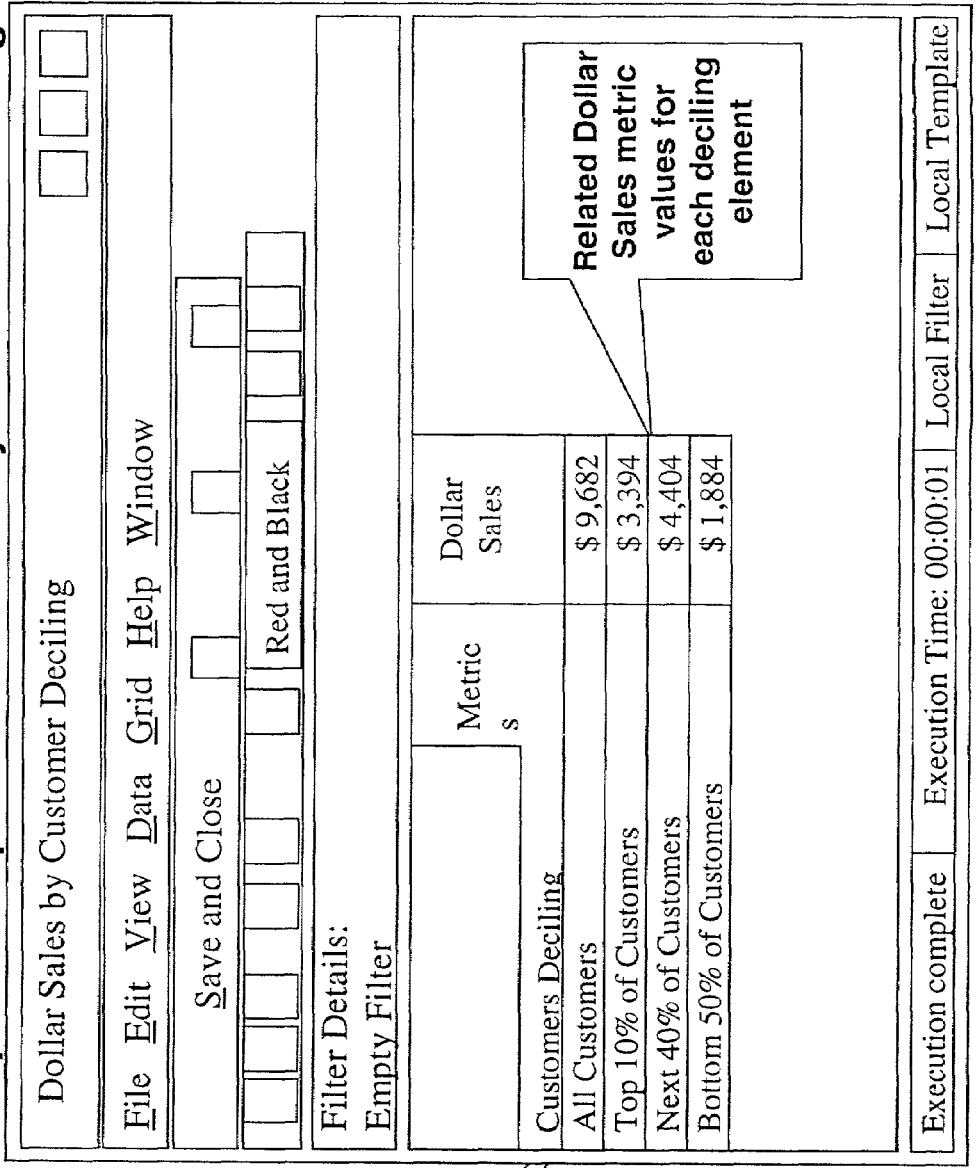
FIG. 13 illustrates an example of an interface display of a report using metric banding and a custom group.

FIGS. 12–16 illustrate an example of a custom group including metric banding. The example of Dollar Sales by Customer Deciling is used in FIGS. 12–16. FIG. 12 illustrates an example of a user interface display on which a Custom Group Editor is shown. The Custom Group Editor, under the Custom Group Band Qualification section, permits a metric (such as Dollar Sales, profit, profit margin, quantity, customer count, etc.) to be chosen and a unit to band on (in this example, percent). Other examples of units the metric can be banded on include, but are not limited to, dollars or units. A banding algorithm and banding parameters are then chosen. In this example, banding points of 1, 10, 50 and 100 percent have been chosen. FIG. 13 illustrates an example of a user interface display showing a report generated by the Custom Group Editor example of FIG. 12. As seen in FIG. 12, the report divides the custom group object (Customers Deciling) into custom group deciling elements (All Customers, Top 10% of Customers, Next 40% of Customers and Bottom 50% of Customers) and displays the chosen metric (Dollar Sales) that relates to each custom group deciling element. Note that the custom group deciling elements are not limited to parts of the same whole, but can be subsets of each other. In this example, each of Top 10% of Customers, Next 40% of Customers and Bottom 50% of Customers is a subset of All Customers.

FIG. 14 shows an example of SQL statements used to produce the custom group deciling elements.

Figure 15:
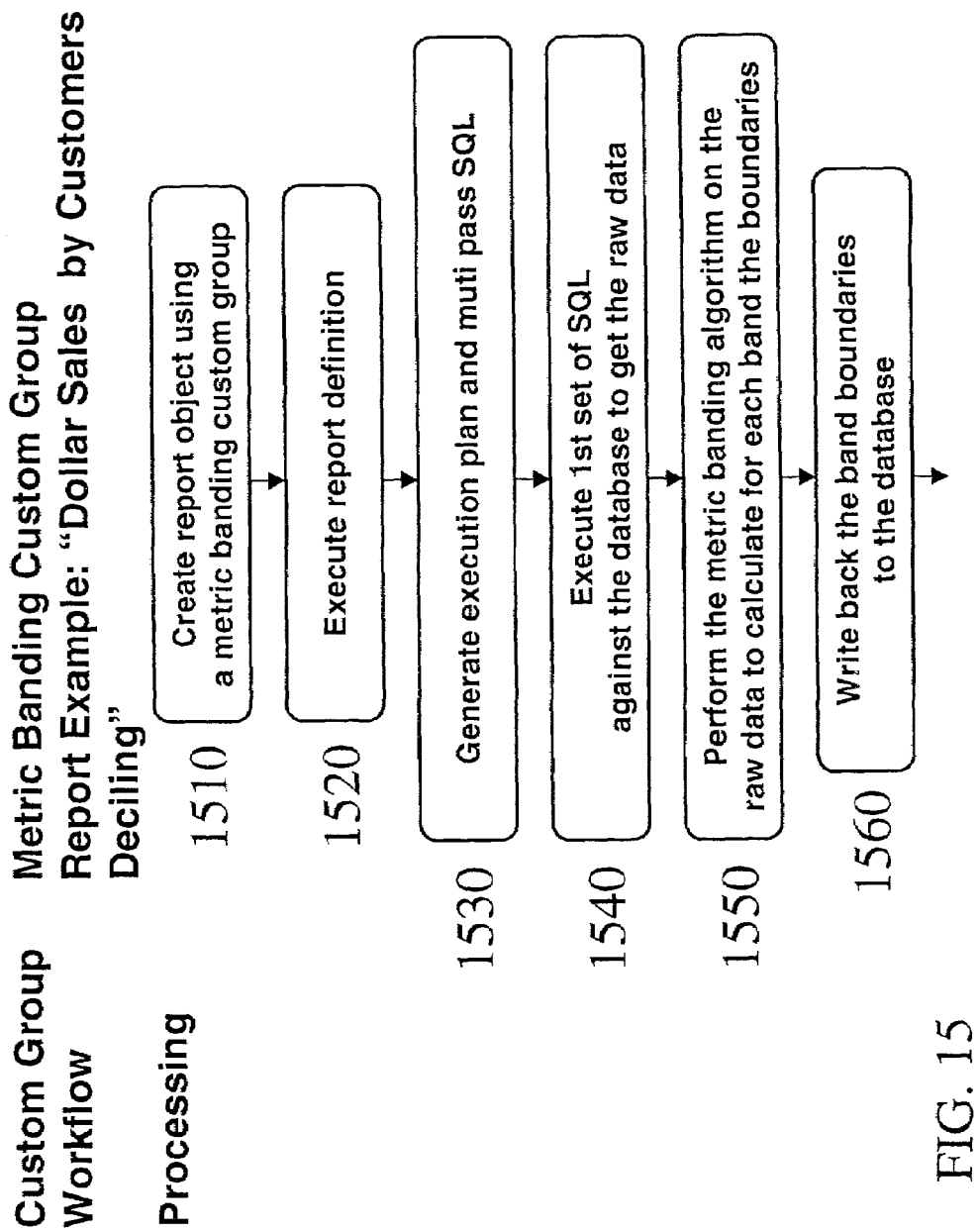
FIGS. 15 and 16 are a flowchart illustrating steps performed by a process of an embodiment of the invention in which a report using metric banding and a custom group is generated.
Figure 16:
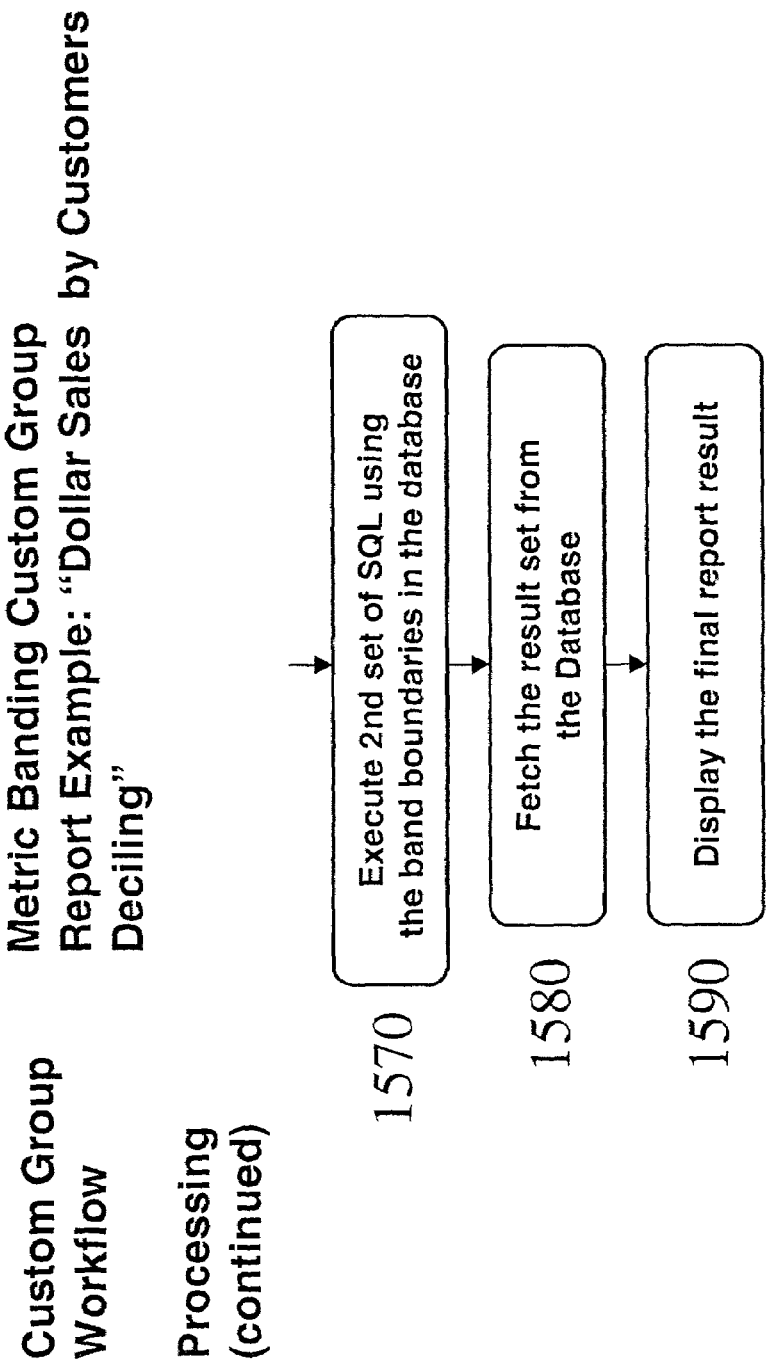

FIGS. 15 and 16 show an example of a flowchart illustrating processing involved with creating and displaying a report of a custom group including metric banding. In step 1510, a report object is created using a metric banding custom group. An example of such a metric banding custom group is "Dollar Sales by Customers Deciling" as shown in FIG. 13. In step 1520, the definition created in step 1510 is executed. The execution of the report definition in step 1520 generates, in step 1530, an execution plan including SQL statements (for example, FIG. 14) for running multiple passes against the database. In step 1540, a first set of SQL statements is executed against the database to produce raw data on which metric banding will be performed.

In step 1550, a metric banding algorithm is applied to the raw data produced in step 1540 to calculate the value on which the data will be banded and the boundaries of the band. In step 1560, the band boundaries calculated in step 1550 are written back to the database and stored. In step 1570, a second set of SQL statements are executed using the boundaries stored in the database in step 1560. In step 1580, the results of the metric banding SQL statements executed in step 1560 are fetched from the database. Finally, in step 1590, the results of step 1580 are displayed as a final report.

While the foregoing description includes many details and specificities, it is to be understood that these have been included for purposes of explanation only, and are not to be interpreted as limitations of the present invention. Modifications to the embodiments described above can be made without departing from the spirit and scope of the invention.

The invention claimed is:

1. A method of providing a custom group for generating data from a database, the data having a data structure, the method comprising:
   creating a custom group object comprising one or more custom group elements;
   defining each of the custom group elements being by at least one filter, each of the filters representing a logical expression of qualifications based on the data, a derived calculation of the data, or both, at least one of the filters being or having been created by a user;
   resolving each of the custom group element filters against the data; and
   grouping the plurality of custom group elements into a consolidated result set which is not naturally existing in the data structure, the consolidated result set comprising the custom grouping.

2. The method of claim 1, wherein the custom group element returns the aggregated result of a function applied over the filtered data set.

3. The method of claim 1, wherein the custom group element returns a set of unaggregated elements equal to the filtered data set.

4. The method of claim 1, wherein the custom group element is defined by a metric and a range.

5. The method of claim 1, wherein one filter of the different filters uses an algorithm to determine what data passes the one filter.

6. The method of claim 1, wherein the custom group object may be used in a report whereby a user may define a custom group object for use in a report to generate groupings without altering the database.

7. The method of claim 6 wherein a report may comprise a custom grouping previously defined and stored for retrieval by users.

8. The method of claim 1 wherein the custom grouping is defined as part of defining a report to be process against the database.

9. A system for grouping data that is stored in a database, the data having a data structure, the system comprising:
   a data storage device that stores the data; and
   a processor that enables a user to create a custom group object comprising one or more custom group elements and define each of the custom group elements being by at least one filter, each of the filters representing a logical expression of qualifications based on the data, a derived calculation of the data, or both, at least one of the filters being or having been created by the user; and
   wherein the processor resolves each of the custom group element filters against the data and groups the plurality of custom group elements into a consolidated result set which is not naturally existing in the data structure, the consolidated result set comprising the custom grouping.

10. The system of claim 9, wherein the custom group element returns the aggregated result of a function applied over the filtered data set.

11. The system of claim 9, wherein the custom group element returns a set of unaggregated elements equal to the filtered data set.

12. The system of claim 9, wherein the custom group element is defined by a metric and a range.

13. The system of claim 9, wherein one filter of the different filters uses an algorithm to determine what data passes the one filter.

14. The system of claim 9, wherein the custom group object may be used in a report whereby a user may define a custom group object for use in a report to generate groupings without altering the database.

15. The system of claim 14 wherein a report may comprise a custom grouping previously defined and stored for retrieval by users.

16. The system of claim 9 wherein the custom grouping is defined as part of defining a report to be process against the database.

17. A recording medium storing processor readable program instructions for causing a processor to group data that is stored in a database, the data having a data structure, the instructions enabling a processor to perform the steps of:
   creating a custom group object comprising one or more custom group elements;
   defining each of the custom group elements being by at least one filter, each of the filters representing a logical expression of qualifications based on the data, a derived calculation of the data, or both, at least one of the filters or being or having been created by the user;
   resolving each of the custom group element filters against the data; and
   grouping the plurality of custom group elements into a consolidated result set which is not naturally existing in the data structure, the consolidated result set comprising the custom grouping.

18. The medium of claim 17, wherein the custom group element returns the aggregated result of a function applied over the filtered data set.

19. The medium of claim 17, wherein the custom group element returns a set of unaggregated elements equal to the filtered data set.

20. The medium of claim 17, wherein the custom group element is defined by a metric and a range.

21. The medium of claim 17, wherein one filter of the different filters uses an algorithm to determine what data passes the one filter.

22. The medium of claim 17, wherein the custom group object may be used in a report whereby a user may define a custom group object for use in a report to generate groupings without altering the database.

* * * * *